(12) United States Patent
Suzuki

(10) Patent No.: US 8,373,920 B2
(45) Date of Patent: Feb. 12, 2013

(54) DISPLAY DEVICE

(75) Inventor: Katsutoshi Suzuki, Miyagi-ken (JP)

(73) Assignee: Alps Electric Co., Ltd., Tokyoq (JP)

( * ) Notice: Subject to any disclaimer, the term of this patent is extended or adjusted under 35 U.S.C. 154(b) by 18 days.

(21) Appl. No.: 13/194,781

(22) Filed: Jul. 29, 2011

(65) Prior Publication Data

US 2012/0062977 A1 Mar. 15, 2012

(30) Foreign Application Priority Data

Sep. 9, 2010 (JP) ................................. 2010-201979

(51) Int. Cl.
*G02F 1/153* (2006.01)
*G09G 3/38* (2006.01)

(52) U.S. Cl. ........ 359/273; 359/266; 359/268; 359/269; 359/274; 345/105; 345/173

(58) Field of Classification Search .......... 359/265–275; 345/84, 105, 173

See application file for complete search history.

(56) References Cited

U.S. PATENT DOCUMENTS

| | | | | |
|---|---|---|---|---|
| 4,488,781 A | * | 12/1984 | Giglia | ........................ 359/271 |
| 5,074,648 A | * | 12/1991 | Warszawski | .................. 359/265 |
| 7,158,276 B1 | * | 1/2007 | Peng et al. | ..................... 359/265 |
| 7,420,727 B2 | * | 9/2008 | Cassidy | ......................... 359/265 |
| 7,869,113 B2 | * | 1/2011 | Jang et al. | ..................... 359/266 |
| 2006/0018001 A1 | | 1/2006 | Kojima et al. | |

FOREIGN PATENT DOCUMENTS

| | | |
|---|---|---|
| JP | 4-49652 | 11/1992 |
| JP | 2006-30820 | 2/2006 |

\* cited by examiner

*Primary Examiner* — Evelyn A. Lester
(74) *Attorney, Agent, or Firm* — Beyer Law Group LLP

(57) ABSTRACT

A display device includes a pair of insulating substrates facing each other, electrochromic elements, and an electrolyte layer. A plurality of electrodes constituting the electrochromic elements are disposed on an inner surface of one of the insulating substrates so as to be spaced from each other. One of the insulating substrates is formed of a flexible member whose outer surface is an input operation surface. A pair of counter electrodes of an input element are disposed between the pair of insulating substrates, the counter electrodes being spaced from the electrodes of the electrochromic elements when viewed in plan. An input operation is performed by bringing the counter electrodes close to each other or bringing the counter electrodes into contact with each other through pressing of the input operation surface.

4 Claims, 3 Drawing Sheets

DISPLAY DEVICE

CLAIM OF PRIORITY

This application claims benefit of Japanese Patent Application No. 2010-201979 filed on Sep. 9, 2010, which is hereby incorporated by reference.

BACKGROUND OF THE INVENTION

1. Field of the Invention

The present invention relates to a display device including an electrochromic element.

2. Description of the Related Art

Display devices utilizing electrochromism in which color changes through an electrochemical oxidation-reduction reaction have been known. In such display devices utilizing electrochromism, long-duration display at low voltage, long life, and the like can be expected.

For example, Japanese Unexamined Patent Application Publication No. 2006-30820 discloses an invention of a display device including a plurality of electrodes disposed on an insulating substrate and a conductive layer disposed on each of the electrodes, the conductive layer containing an electrochromic material.

Japanese Examined Utility Model Registration Application Publication No. 4-49652 discloses an invention of a display device including an electrochromic element that includes an electrode which is electrically divided into an inner periphery and an outer periphery and an electrochromic layer.

However, among conventional display devices including an electrochromic element, there has been no display device having an input operation function operated with a switch or the like together with a display function operated with an electrochromic element.

SUMMARY OF THE INVENTION

Accordingly, the present invention provides a thin type display device in which an input operation can be performed with a stable display.

A display device of the present invention includes a pair of substrates facing each other with a space in a height direction; a plurality of electrochromic elements each including an electrode disposed on an inner surface of one of the substrates and an electrochromic layer disposed on a surface of the electrode; and an electrolyte layer disposed between the substrates, wherein the electrodes of the electrochromic elements are spaced from each other and an oxidation-reduction reaction is caused between the electrochromic layers disposed on the surfaces of the electrodes by applying a voltage between the electrodes; at least one of the substrates is formed of a flexible member whose outer surface is an input operation surface; a pair of counter electrodes of an input element are disposed on the inner surfaces of the pair of substrates so as to face each other in the height direction, the counter electrodes being spaced from the electrodes of the electrochromic elements when viewed in plan; and an input operation is performed by bringing the counter electrodes close to each other or bringing the counter electrodes into contact with each other through pressing of the input operation surface.

In the present invention, the plurality of electrodes each constituting the electrochromic element are disposed on the inner surface of one of the substrates so as to be spaced from each other. Furthermore, in the present invention, the input element is disposed between the pair of substrates. Herein, the counter electrodes constituting the input element are spaced from the electrodes of the electrochromic elements when viewed in plan.

Therefore, when the input element is operated by bringing the counter electrodes close to each other or bringing the counter electrodes into contact with each other through pressing of the input operation surface, a short circuit between the electrodes of the electrochromic elements can be prevented.

According to the display device of the present invention, an input operation can be performed with a stable display without increasing the distance between the pair of insulating substrates.

A display device of the present invention includes a pair of substrates facing each other with a space in a height direction; an electrochromic element including an electrode disposed on an inner surface of one of the substrates and an electrochromic layer disposed on a surface of the electrode; another electrochromic element including an electrode disposed on an inner surface of the other of the substrates and an electrochromic layer disposed on a surface of the electrode; and an electrolyte layer disposed between the substrates, wherein the electrochromic elements are disposed on the inner surfaces of the substrates and the electrodes of the electrochromic elements are spaced from each other when viewed in plan; an oxidation-reduction reaction is caused between the electrochromic layers disposed on the surfaces of the electrodes by applying a voltage between the electrodes; at least one of the substrates is formed of a flexible member whose outer surface is an input operation surface; a pair of counter electrodes of an input element are disposed on the inner surfaces of the pair of substrates so as to face each other in the height direction, the counter electrodes being spaced from the electrodes of the electrochromic elements when viewed in plan; and an input operation is performed by bringing the counter electrodes close to each other or bringing the counter electrodes into contact with each other through pressing of the input operation surface.

In the present invention, the electrochromic elements are disposed on the inner surfaces of the pair of substrates. Herein, the electrodes of the electrochromic elements are spaced from each other when viewed in plan. Furthermore, in the present invention, the input element is disposed between the pair of substrates. Herein, the counter electrodes constituting the input element are spaced from the electrodes of the electrochromic elements when viewed in plan.

Therefore, when the input element is operated by bringing the counter electrodes close to each other or bringing the counter electrodes into contact with each other through pressing of the input operation surface, a short circuit between the electrodes of the electrochromic elements can be prevented.

According to the display device of the present invention, an input operation can be performed with a stable display without increasing the distance between the pair of insulating substrates.

In the present invention, the electrochromic elements are disposed on the inner surfaces of the pair of substrates. Consequently, the migration length of ions in the electrolyte layer can be decreased, and thus the display speed with the electrochromic elements can be increased through a smooth oxidation-reduction reaction.

In the present invention, an operating voltage at the input element is preferably lower than a threshold voltage applied between the electrodes of the electrochromic elements. Thus, an input operation can be appropriately performed with a stable display.

DESCRIPTION OF THE PREFERRED EMBODIMENTS

Figure 1A:
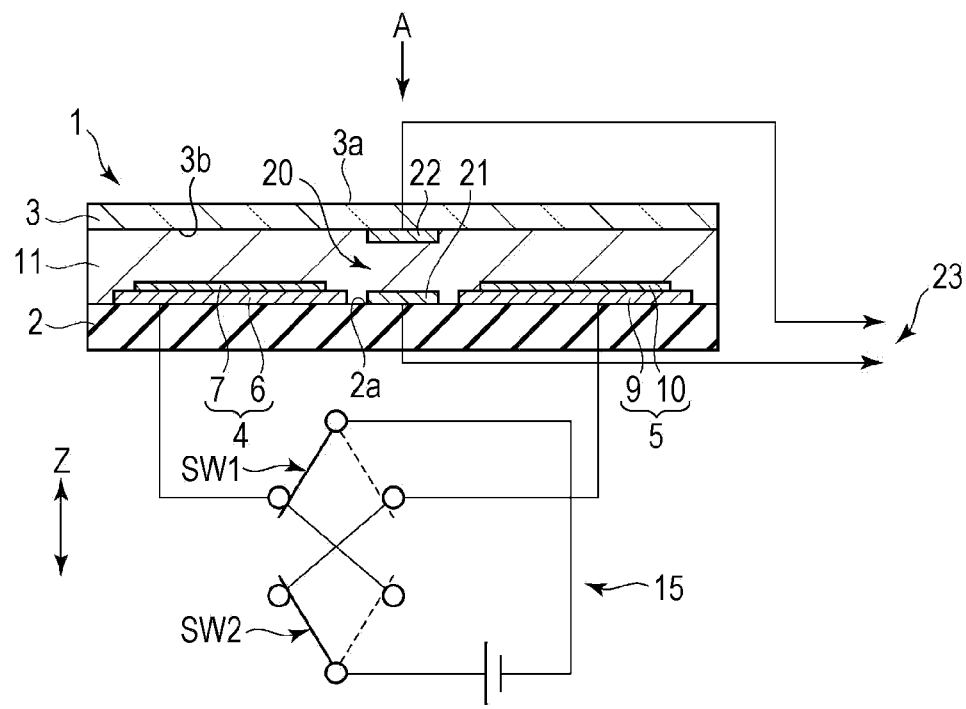
FIGS. 1A and 1B are partial longitudinal sectional views of a display device according to a first embodiment of the present invention and FIG. 1B shows the state in which an input operation is performed from the state shown in FIG. 1A (non-input operation state)
Figure 1B:
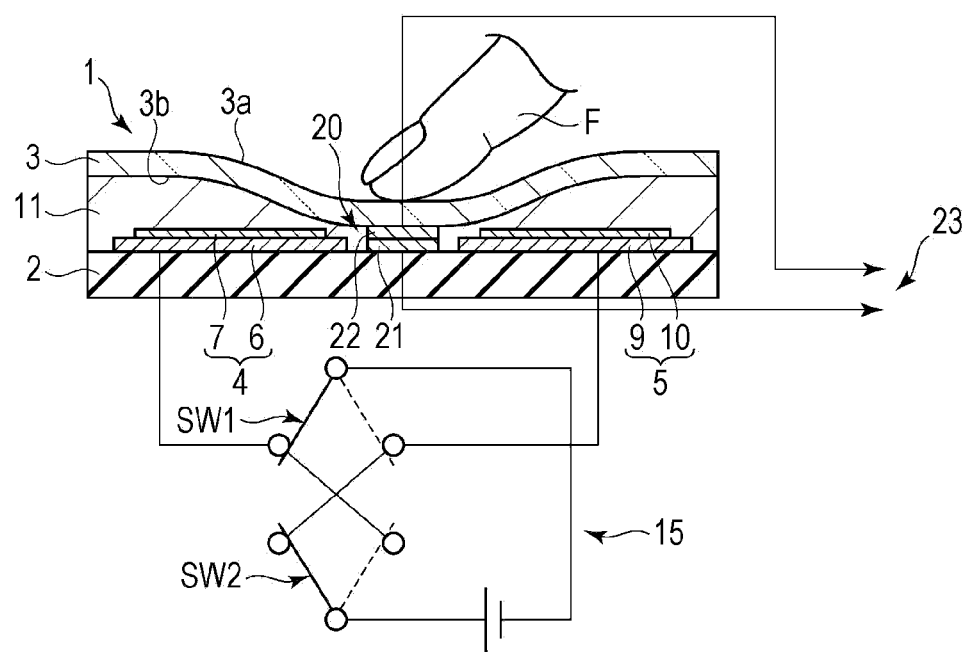

FIGS. 1A and 1B are partial longitudinal sectional views of a display device according to a first embodiment of the present invention. FIG. 1B shows the state in which an input operation is performed from the state shown in FIG. 1A (non-input operation state).

The configuration of a display device 1 of a first embodiment will now be described mainly with reference to FIG. 1A. As shown in FIG. 1A, a first insulating substrate 2 and a second insulating substrate 3 constituting the display device 1 face each other with a space in the height (Z) direction.

The second insulating substrate 3 is formed of a flexible substrate whose outer surface is an input operation surface 3a. A resin film is preferably applied to the second insulating substrate 3. Examples of the resin film include a polyethylene terephthalate (PET) film, a polyethylene naphthalate (PEN) film, a polyphenylene sulfide (PPS) film, and a polycarbonate (PC) film. The first insulating substrate 2 may be formed of a flexible substrate or a glass substrate, which is a rigid material.

The second insulating substrate 3 having the input operation surface 3a that also serves as a display surface is at least a transparent substrate. Herein, the term "transparent" mean that the transmittance of visible light is 60% or more (preferably 80% or more).

As shown in FIG. 1A, a first electrochromic element 4 and a second electrochromic element 5 are disposed on an inner surface 2a of the first insulating substrate 2 so as to be spaced from each other.

As shown in FIG. 1A, the first electrochromic element 4 includes a first electrode 6 and a first electrochromic layer 7. The second electrochromic element 5 includes a second electrode 9 and a second electrochromic layer 10.

As shown in FIG. 1A, the first electrode 6 constituting the first electrochromic element 4 and the second electrode 9 constituting the second electrochromic element 5 are disposed on the inner surface 2a of the first insulating substrate 2 so as to be spaced from each other.

The first electrode 6 and the second electrode 9 are each a transparent electrode. The material is not particularly limited, and indium tin oxide (ITO) is preferably used.

As shown in FIG. 1A, the first electrode 6 and the second electrode 9 are formed on the inner surface 2a of the first insulating substrate 2 by a known method such as sputtering.

As shown in FIG. 1A, the electrochromic layers 7 and 10 are disposed on surfaces of the electrodes 6 and 9, respectively.

The electrochromic layers 7 and 10 each include an electrochromic material (electrochromic dye) and a supporting body (e.g., nanoparticles of a metal oxide, a porous material, or the like) that can support the electrochromic material. Any electrochromic material can be used as long as the electrochromic material shows a reversible color change (electrochromism, change between colored state and decolorized state) through an electrochemical oxidation-reduction reaction. An example of the electrochromic material is a known electrochromic compound based on a metal complex, a metal oxide, or a polymer. An example of the metal complex is a Prussian blue complex. The Prussian blue complex is pulverized into nanoparticles to form an ink, whereby the electrochromic layers 7 and 10 including the electrochromic material can be formed by printing or the like. Thus, the electrochromic layers 7 and 10 can be easily formed on the surfaces of the electrodes 6 and 9, respectively, with a thickness smaller than those of the electrodes 6 and 9.

As shown in FIG. 1A, an electrolyte layer 11 is disposed between the pair of insulating substrates 2 and 3 (a space between the insulating substrates 2 and 3 is filled with an electrolyte layer 11). Not only a liquid electrolyte but also a gel electrolyte or a solid electrolyte can be used. Examples of the electrolyte include perchlorates, iron complexes, metal halides, alkali metal salts, and alkaline earth metal salts. Examples of a solvent include ethers, carbonates, and alcohols.

As shown in FIG. 1A, the respective electrodes 6 and 9 of the electrochromic elements 4 and 5 are connected to an electric circuit 15. When a voltage is applied between the electrodes 6 and 9 by the electric circuit 15, the first electrochromic layer 7 containing a Prussian blue complex turns blue through, for example, an oxidation reaction caused due to the movement of cations and electrons of the electrolyte layer 11 disposed between the electrochromic elements 4 and 5 and the second electrochromic layer 10 is decolorized (becomes transparent) through a reduction reaction. The display of the first electrochromic element 4 can be seen from the input operation surface (display surface) 3a side through the second insulating substrate 3 composed of a transparent substrate. When switches SW1 and SW2 in the electric circuit 15 shown in FIG. 1A are switched, an oxidation-reduction reaction opposite to the above-described oxidation-reduction reaction is caused to proceed. For example, the first electrochromic layer 7 is decolorized (becomes transparent) through a reduction reaction and the second electrochromic layer 10 containing a Prussian blue complex turns blue. Thus, the display of the second electrochromic element 5 can be seen from the input operation surface 3a side through the second insulating substrate 3 composed of a transparent substrate.

The first electrochromic layer 7 and the second electrochromic layer 10 each have a predetermined shape of, for example, a character, number, or mark. When such electrochromic layers are colored, the predetermined shape appears on the input operation surface (display surface) 3a. The voltage (threshold voltage) applied between the electrodes 6 and 9 is about several tens of millivolts to several volts. Thus, even if the power supply is turned off after the application of voltage, the colored state can be retained for a long time.

As shown in FIG. 1A, in this embodiment, in addition to the electrochromic elements 4 and 5, an input element 20 is disposed between the first insulating substrate 2 and the second insulating substrate 3. The input element 20 includes a first counter electrode 21, a second counter electrode 22, and an electric circuit 23 connected to the counter electrodes 21 and 22. The first counter electrode 21 is disposed on the inner surface 2a of the first insulating substrate 2 so as to be spaced from the respective electrodes 6 and 9 of the electrochromic elements 4 and 5. In FIG. 1A, the first counter electrode 21 is disposed between the first electrochromic element 4 and the second electrochromic element 5 so as to be spaced from the electrochromic elements 4 and 5. However, a position at which the first counter electrode 21 is disposed is not limited to the position shown in FIG. 1A.

As shown in FIG. 1A, the second counter electrode 22 is disposed on an inner surface 3b of the second insulating substrate 3 so as to face the first counter electrode 21 in the height (Z) direction.

Thus, the counter electrodes 21 and 22 are spaced from the respective electrodes 6 and 9 of the electrochromic elements 4 and 5 when viewed in plan (when viewed in the direction indicated by an arrow A).

The first counter electrode 21 and the second counter electrode 22 are preferably transparent electrodes similar to the electrodes 6 and 9. That is, in this embodiment, the first counter electrode 21, the second counter electrode 22, and the electrodes 6 and 9 can be composed of, for example, indium tin oxide (ITO). In this case, the counter electrodes 21 and 22 can be formed together with the electrodes 6 and 9 in the same step with the same thickness, which can provide a thin type display device 1 including the input element 20 and having a simple structure by a simple method.

Since the second insulating substrate 3 having at least the input operation surface 3a is formed of a flexible substrate as described above, the input operation surface 3a can be deformed by being pressed with a finger F or the like in the downward direction (in the direction toward the first insulating substrate 2) as shown in FIG. 1B. By this pressing, the first counter electrode 21 and the second counter electrode 22 can be brought into contact with each other or brought close to each other. As a result, the electric circuit 23 can output an input operation signal (e.g., switch signals of On and Off) in accordance with a change in voltage.

Figure 3:
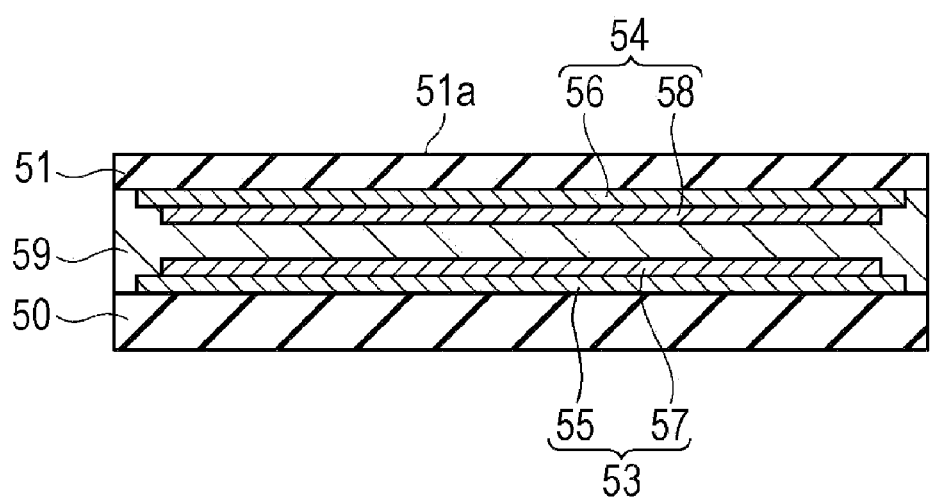
FIG. 3 is a partial longitudinal sectional view of a display device in Comparative Example.

FIG. 3 is a partial longitudinal sectional view of a display device in Comparative Example. In Comparative Example shown in FIG. 3, electrochromic elements 53 and 54 are disposed on inner surfaces of a pair of insulating substrates 50 and 51, respectively. The electrochromic elements 53 and 54 respectively include electrodes 55 and 56 facing each other and electrochromic layers 57 and 58 facing each other. Reference numeral 59 denotes an electrolyte layer. In Comparative Example, the outer surface of the insulating substrate 51 functions as an input operation surface 51a. When the input operation surface 51a is pressed in the downward direction (in the direction toward the insulating substrate 50), the respective electrodes 55 and 56 of the electrochromic elements 53 and 54 contact each other to establish a short circuit. Thus, a proper display cannot be achieved.

In contrast, in this embodiment, the respective electrodes 6 and 9 of the electrochromic elements 4 and 5 are disposed on the inner surface 2a of the first insulating substrate 2 so as to be spaced from each other. In addition, the input element 20 is disposed between the pair of insulating substrates 2 and 3 in this embodiment. Herein, the counter electrodes 21 and 22 constituting the input element 20 are spaced from the respective electrodes 6 and 9 of the electrochromic elements 4 and 5 when viewed in plan.

Therefore, as shown in FIG. 1B, when the input element 20 is operated by pressing the input operation surface 3a, a short circuit between the respective electrodes 6 and 9 of the electrochromic elements 4 and 5 can be prevented. Note that the electrochromic elements 4 and 5 sometimes contact the inner surface 3b of the second insulating substrate 3 by pressing the input operation surface 3a, but this causes no problem because a short circuit is not established between the respective electrodes 6 and 9 of the electrochromic elements 4 and 5.

According to the display device 1 of this embodiment, since the input element 20 is disposed between the pair of insulating substrates 2 and 3, the distance between the insulating substrates 2 and 3 is not increased and thus a thin type display device can be obtained. Furthermore, even if pressing is performed to operate the input element 20, a short circuit is not established between the respective electrodes 6 and 9 of the electrochromic elements 4 and 5. Consequently, an input operation can be performed with a stable display.

In the configuration shown in FIG. 1A, the electrochromic elements 4 and 5 may be disposed on the inner surface 3b of the second insulating substrate 3 having the input operation surface 3a. The respective electrochromic layers 7 and 10 of the electrochromic elements 4 and 5 may be integrally disposed.

Figure 2A:
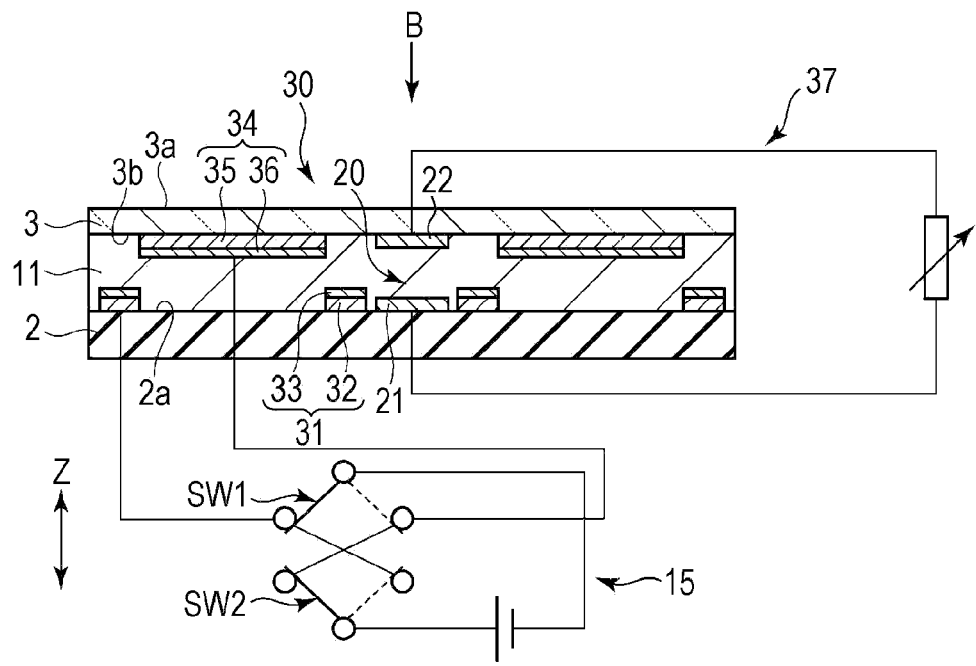
FIGS. 2A and 2B are partial longitudinal sectional views of a display device according to a second embodiment of the present invention and FIG. 2B shows the state in which an input operation is performed from the state shown in FIG. 2A (non-input operation state)
Figure 2B:
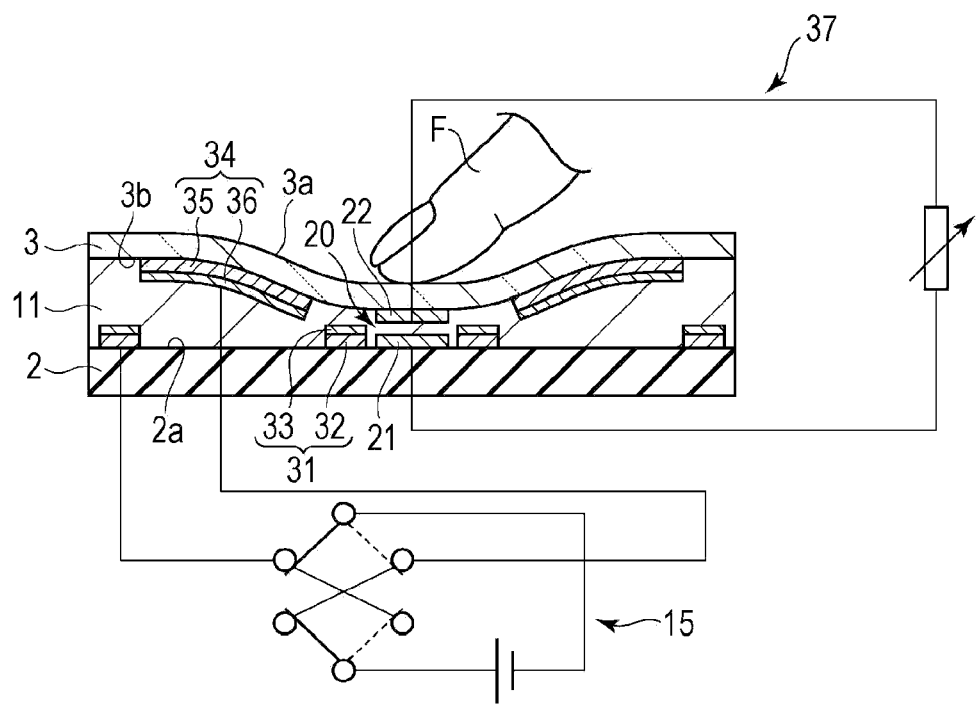

FIGS. 2A and 2B are partial longitudinal sectional views of a display device according to a second embodiment of the present invention. FIG. 2B shows the state in which an input operation is performed from the state shown in FIG. 2A (non-input operation state).

The configuration of a display device 30 of a second embodiment will now be described mainly with reference to FIG. 2A. In FIGS. 2A and 2B, the same components as those in FIGS. 1A and 1B are denoted by the same reference numerals as those in FIGS. 1A and 1B.

As in the display device 1 shown in FIG. 1A, the display device 30 shown in FIG. 2A also has a structure in which an electrochromic layer 11 is disposed between a first insulating substrate 2 and a second insulating substrate 3.

As shown in FIG. 2A, a third electrochromic element 31 is disposed on an inner surface 2a of the first insulating substrate 2. The third electrochromic element 31 includes a third electrode 32 disposed on the inner surface 2a of the first insulating substrate 2 and an electrochromic layer 33 disposed on a surface of the third electrode 32. In FIG. 2A, a plurality of third electrochromic elements 31 are illustrated in the section, and a reference numeral is given to only one of the third electrochromic elements 31. The electrodes 32 of the plurality of third electrochromic elements 31 illustrated in the section of FIG. 2A may be connected to each other in an integrated manner at positions not shown in FIG. 2A or may be individually separated from each other.

A fourth electrochromic element 34 is disposed on an inner surface 3b of the second insulating substrate 3. The fourth electrochromic element 34 includes a fourth electrode 35 disposed on the inner surface 3b of the second insulating substrate 3 and an electrochromic layer 36 disposed on a surface of the fourth electrode 35. In FIG. 2A, a plurality of fourth electrochromic elements 34 are illustrated in the section, and a reference numeral is given to only one of the fourth electrochromic elements 34. The electrodes 35 of the plurality of fourth electrochromic elements 34 illustrated in the section of FIG. 2A may be connected to each other in an integrated manner at positions not shown in FIG. 2A or may be individually separated from each other.

In the configuration shown in FIG. 2A, the respective electrodes 32 and 35 of the electrochromic elements 31 and 34 are connected to an electric circuit 15. When a voltage is applied between the electrodes 32 and 35 by the electric circuit 15, the third electrochromic layer 33 containing a Prussian blue complex turns blue through, for example, an oxidation reaction caused due to the movement of cations and electrons of the electrolyte layer 11 disposed between the electrochromic elements 31 and 34 and the fourth electrochromic layer 36 is decolorized (becomes transparent) through a reduction reaction. The display of the third electrochromic element 31 can be seen from the input operation surface 3a side through the second insulating substrate 3 composed of a transparent substrate. When switches SW1 and SW2 in the electric circuit 15 shown in FIG. 2A are switched, an oxidation-reduction reaction opposite to the above-described oxidation-reduction reaction is caused to proceed. For example, the third electrochromic layer 33 is decolorized (becomes transparent) through a reduction reaction and the fourth electrochromic layer 36 containing a Prussian blue complex turns blue. Thus, the display of the fourth electrochromic element 34 can be seen from the input operation surface 3a side through the second insulating substrate 3 composed of a transparent substrate.

As shown in FIG. 2A, the third electrode 32 (third electrochromic element 31) and the fourth electrode 35 (fourth electrochromic element 34) are spaced from each other when viewed in plan (when viewed in the direction indicated by an arrow B) so as not to face each other in the height (Z) direction.

As shown in FIG. 2A, in this embodiment, in addition to the electrochromic elements 31 and 34, an input element 20 is disposed between the first insulating substrate 2 and the second insulating substrate 3. The input element 20 includes a first counter electrode 21, a second counter electrode 22, and an electric circuit 37 connected to the counter electrodes 21 and 22. The first counter electrode 21 is disposed on the inner surface 2a of the first insulating substrate 2 so as to be spaced from the electrode 32 of the third electrochromic element 31.

As shown in FIG. 2A, the second counter electrode 22 is disposed on the inner surface 3b of the second insulating substrate 3 so as to face the first counter electrode 21 in the height (Z) direction. The second counter electrode 22 is spaced from the electrode 35 of the fourth electrochromic element 34.

As shown in FIG. 2A, in this embodiment, the electrochromic elements 31 and 34 are disposed on the inner surfaces of the pair of insulating substrates 2 and 3, respectively. Herein, the respective electrodes 32 and 35 of the electrochromic elements 31 and 34 are spaced from each other when viewed in plan. Furthermore, the input element 20 is disposed between the pair of insulating substrates 2 and 3 in this embodiment. Herein, the counter electrodes 21 and 22 constituting the input element 20 are spaced from the respective electrodes 32 and 35 of the electrochromic elements 31 and 34 when viewed in plan.

Therefore, when the input element 20 is operated by bringing the counter electrodes 21 and 22 close to each other or bringing the counter electrodes 21 and 22 into contact with each other through pressing of the input operation surface 3a, a short circuit between the respective electrodes 32 and 35 of the electrochromic elements 31 and 34 can be prevented. In FIG. 2B, by pressing the input operation surface 3a, the fourth electrochromic element 34 sometimes contacts the inner surface 2a of the first insulating substrate 2 and the third electrochromic element 31 sometimes contacts the inner surface 3b of the second insulating substrate 3, but this causes no problem because the respective electrodes 32 and 35 of the electrochromic elements 31 and 34 do not contact each other.

According to the display device 30 of this embodiment, since the input element 20 is disposed between the pair of insulating substrates 2 and 3, the distance between the insulating substrates 2 and 3 is not increased and thus a thin type display device can be obtained. Furthermore, even if pressing is performed to operate the input element 20, a short circuit is not established between the respective electrodes 32 and 35 of the electrochromic elements 31 and 34. Consequently, an input operation can be performed with a stable display.

In the embodiment shown in FIGS. 2A and 2B, the electrochromic elements 31 and 34 are disposed on the inner surfaces 2a and 3b of the pair of insulating substrates 2 and 3, respectively. Therefore, the migration length of ions in the electrolyte layer 11 can be decreased, and thus the display speed with the electrochromic elements 31 and 34 can be increased through a smooth oxidation-reduction reaction.

As shown in FIGS. 2A and 2B, in the electric circuit 37 of the input element 20, an analog signal (input signal) can be obtained in accordance with a change in voltage (resistance) generated as the distance between the counter electrodes 21 and 22 gradually changes due to pressing.

In the configuration shown in FIG. 2A, a reflective layer composed of titanium oxide or the like can be disposed in the electrolyte layer 11. Thus, only the fourth electrochromic element 34 can be displayed.

Three or more electrochromic elements may be disposed. These electrochromic elements have different shapes or develop different colors using different electrochromic materials. In the case where three or more electrochromic elements are disposed, three or more electrochromic elements may be disposed on the inner surface of one of the insulating substrates 2 and 3 so as to be spaced from each other as shown in FIG. 1A or three or more electrochromic elements may be disposed on the respective inner surfaces 2a and 3b of both the insulating substrates 2 and 3 so as not to face each other in the height direction.

The operating voltage at the input element 20 shown in FIGS. 1A and 2A is preferably lower than the threshold voltage applied between the electrodes of the electrochromic elements. The term "threshold voltage" is a voltage required to color (decolorize) the electrochromic elements. As shown in FIGS. 1A and 2A, the counter electrodes 21 and 22 of the input element 20 and the electrodes of the electrochromic elements are present in the same electrolyte layer 11. Therefore, if the operating voltage at the input element 20 is higher than the threshold voltage, the oxidation-reduction reaction in the electrochromic layers are facilitated due to the operating voltage, which may cause an abnormal display of the electrochromic elements. Thus, by controlling the operating voltage at the input element 20 to be lower than the threshold voltage applied between the electrodes of the electrochromic elements, an input operation can be appropriately performed with a stable display of the electrochromic elements.

What is claimed is:

1. A display device comprising:
a pair of substrates facing each other with a space therebetween in a height direction;
a plurality of electrochromic elements each including an electrode disposed on an inner surface of one of the substrates and an electrochromic layer disposed on a surface of the electrode; and
an electrolyte layer disposed between the substrates,
wherein the electrodes of the electrochromic elements are spaced from each other and an oxidation-reduction reaction is caused between the electrochromic layers disposed on the surfaces of the electrodes by applying a voltage between the electrodes,
at least one of the substrates is formed of a flexible member whose outer surface is an input operation surface,
a pair of counter electrodes of an input element are disposed on the inner surfaces of the pair of substrates so as to face each other in the height direction, the counter electrodes being spaced from the electrodes of the electrochromic elements when viewed in plan, and
an input operation is performed by bringing the counter electrodes close to each other or bringing the counter electrodes into contact with each other through pressing of the input operation surface.

2. A display device comprising:
a pair of substrates facing each other with a space in a height direction;

an electrochromic element including an electrode disposed on an inner surface of one of the substrates and an electrochromic layer disposed on a surface of the electrode;

another electrochromic element including an electrode disposed on an inner surface of the other of the substrates and an electrochromic layer disposed on a surface of the electrode; and an electrolyte layer disposed between the substrates, wherein the electrochromic elements are disposed on the inner surfaces of the substrates and the electrodes of the electrochromic elements are spaced from each other when viewed in plan, an oxidation-reduction reaction is caused between the electrochromic layers disposed on the surfaces of the electrodes by applying a voltage between the electrodes, at least one of the substrates is formed of a flexible member whose outer surface is an input operation surface, a pair of counter electrodes of an input element are disposed on the inner surfaces of the pair of substrates so as to face each other in the height direction, the counter electrodes being spaced from the electrodes of the electrochromic elements when viewed in plan, and an input operation is performed by bringing the counter electrodes close to each other or bringing the counter electrodes into contact with each other through pressing of the input operation surface.

3. The display device according to claim 1, wherein an operating voltage at the input element is lower than a threshold voltage applied between the electrodes of the electrochromic elements.

4. The display device according to claim 2, wherein an operating voltage at the input element is lower than a threshold voltage applied between the electrodes of the electrochromic elements.

* * * * *